United States Patent [19]
Lambert

[11] Patent Number: 5,308,298
[45] Date of Patent: May 3, 1994

[54] HYDRAULIC CONTROL SYSTEMS

[75] Inventor: David R. Lambert, Preston, England

[73] Assignee: Torotrak (Development) Limited, England

[21] Appl. No.: 920,586

[22] PCT Filed: Mar. 18, 1991

[86] PCT No.: PCT/GB91/00414

§ 371 Date: Aug. 20, 1992

§ 102(e) Date: Aug. 20, 1992

[87] PCT Pub. No.: WO91/14116

PCT Pub. Date: Sep. 19, 1991

[30] Foreign Application Priority Data

Mar. 16, 1990 [GB] United Kingdom ............... 9005969

[51] Int. Cl.$^5$ ............................................. F16H 15/38
[52] U.S. Cl. ........................................ 476/10; 476/41
[58] Field of Search .................................. 476/10, 41

[56] References Cited

U.S. PATENT DOCUMENTS

| 3,570,317 | 3/1971 | Kraus | 74/200 |
| 4,499,782 | 2/1985 | Perry | 476/10 |
| 4,524,641 | 6/1985 | Greenwood | 476/10 |

FOREIGN PATENT DOCUMENTS

| 0076667 | 4/1983 | European Pat. Off. |
| 0078125 | 5/1983 | European Pat. Off. |
| 0133330 | 2/1985 | European Pat. Off. |
| 0356102 | 2/1990 | European Pat. Off. |
| 90/04729 | 5/0390 | World Int. Prop. O. |

Primary Examiner—Allan D. Herrmann
Attorney, Agent, or Firm—Davis, Bujold & Streck

[57] ABSTRACT

A hydraulic control system for a continuously-variable-ratio-vehicle transmission of the toroidal-race rolling-traction type, in which the mechanism for positioning each roller includes a double-acting ram (11). The two opposed faces of the ram are exposed in normal use to the pressures of two separate lines of fluid (21, 23), each being pressure-controlled by separate valves (32, 34) located downstream of the respective ram face. The outputs of those separate valves combine in a common region (31), and further valve means (40, 41) open to connect that region to each line in response to the occurrence of a predetermined difference in pressure between the region and that line. In such circumstances such connection and the resulting transfer of fluid from the region to the line helps to counteract any tendency to fluid starvation in the line. This might otherwise occur for instance in response to the rapid movement of all the double-acting rams in the same direction, for example when the vehicle is approaching wheel-lock during emergency braking.

6 Claims, 1 Drawing Sheet

HYDRAULIC CONTROL SYSTEMS

This invention relates to hydraulic control systems for continuously-variable-ratio transmissions ("CVT's") of the toroidal-race rolling-traction type. It relates in particular to such transmissions in which so-called "hydraulic roller control" is used, that is to say transmissions in which the rollers are mounted on or otherwise connected to double-acting hydraulic rams, the opposite ends or faces of which are exposed to separate flows of fluid each at controlled pressure. Movement of the ram back and forth causes the roller centre to move back and forth along the centre circle of the common torus presented by the input and output races, and so to change the transmitted ratio in a manner well understood in the art.

BACKGROUND OF THE INVENTION

Such a hydraulic control mechanism is shown and described, instance, in patent specification EP-B-0133330. More particularly still, the invention applies to a control system for a transmission having a plurality of rollers, typically six, each mounted on an individual ram and all of which must transmit the same ratio at any one time. One of those rollers, known in the art as the "master roller", is mounted on a double-acting ram the two cylinders of which are in direct connection with the control valves by which the two fluid pressures are controlled, while the fluid in the corresponding ram cylinders of each of the other rollers (known as the "slave rollers") is simply in communication with the cylinders of the master roller and so at a common pressure. A control circuit for such a combination of the master and slave rollers is also described in specification EP-B-0133330.

When a transmission with such a control system is working for the time being at normal rates of ratio change, the roller control rams will all be moving slowly within their respective cylinders. The separate flows of fluid down the two sides of the system–that is to say a first side including all the cylinders at one end of the respective rams, and a second side including all the cylinders at the other end–need only be sufficient to maintain the cylinders full on that side of the system where the cylinder volumes are increasing. A flow rate of a maximum of say 10–15 L/min is typical for vehicle transmissions, so that the hydraulic power source of the system need only comprise two small pumps each capable of delivering that flow, or alternatively a single pump capable of delivering say 20–30 L/min and fitted with a flow divider. However, when such a transmission undergoes a very rapid change of ratio, for instance when fitted to a vehicle which is approaching wheel-lock during emergency braking, all the roller control rams move rapidly in the same direction. The volume avalilable for fluid in the cylinders on one side of the system therefore increases rapidly, requiring a power source capable of delivering a considerable flow in order to maintain a reasonable minimum pressure within the cylinders or, in an extreme case, to avoid cavitation within them. To meet such conditions, it has therefore been customary to provide such hydraulic control systems with power sources far larger and more powerful than is necessary while the rams are either stationary or moving slowly, as is the case during most of the working life of the transmission.

SUMMARY OF THE INVENTION

The present invention arises rom appreciating that such conditions tend to create a substantial fluid pressure difference between the region of the circuit that lies downstream of the control valves, and the upstream side of the system where cylinder volumes are increasing, and that this pressure difference may be used to trigger the transfer of fluid to the upstream, low pressure, side. The tendency to fluid starvation on the low pressure side is therefore diminished, and with it the maximum flow rate demanded of the source and so the size and expense of the source itself. Means for effecting such transfer are quite absent in prior publications such as patent specification EP-B-0133330 and the related EP-B-0078125 where the it outlets of the respective control valves—identified by reference 23 in both specifications—lead only to tank or exhaust, and there is no means of connection between those outlets and upstream regions of the hydraulic circuitry.

BRIEF DESCRIPTION OF THE DRAWINGS

The invention is defined by the claims, the contents of which are to be read as included within the disclosure of this specification, and includes hydraulic control systems as described with reference to the accompanying drawings. The invention will now be described by way of example with reference to those drawings in which:

DESCRIPTION OF THE PREFERRED EMBODIMENTS

Figure 1:
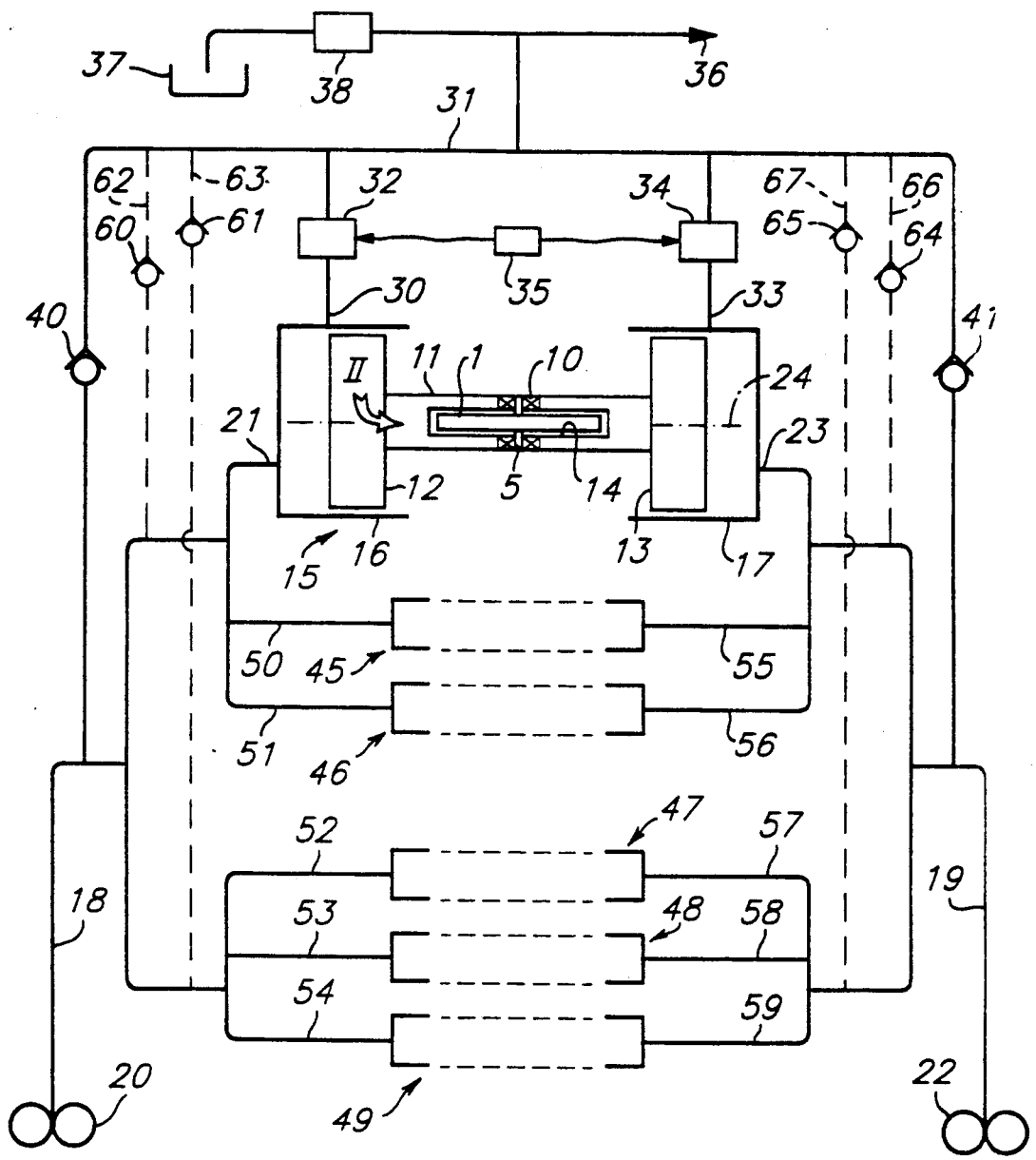
FIG. 1 is a schematic view of a hydraulic control circuit for a vehicle CVT.
Figure 2:
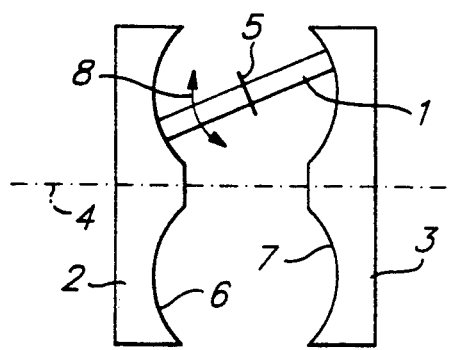
FIG. 2 is a partial view in the direction of the arrow II in FIG. 1.

In FIGS. 1 and 2, roller 1 is one rollers that transmit traction between an input and an output disc of a transmission of the toroidal-race rolling-traction type. FIG. 2 shows input and output discs 2 and 3 rotatable about a common axis 4, with roller I rotatable about an axle 5 and in rolling contact with part-toroidal races 6 and 7 of discs 2 and 3 respectively. As is well known in the art, by tilting roller 1 in the direction indicated by arrow 8 the transmitted ratio is changed.

As FIG. 1 shows, the axle 5 of roller 1 is mounted in bearings 10 in a shaft 11 carrying pistons 12, 13 at its opposite ends. Shaft 11 is also formed with a slot 14, providing clearance within which the roller rotates. Shaft 11 and pistons 12, 13 form parts of a double-ended ram unit which is indicated generally by reference 15. Pistons 12, 13 move within cylinders 16, 17 respectively. Cylinders 16 and 17 are connected to opposite sides 18, 19 of a hydraulic circuit. Side 18 receives the delivery of a pump 20 and is connected to the inlet 21 of cylinder 16, and side 19 receives the delivery of a pump 22 and is connected to the inlet 23 of cylinder 17. Pistons 12, 13 can rotate about their common axis 24 within their cylinders 16 and 17. As is well known in the art, under such control systems the roller I seeks a ratio angle—that is to say a particular angular setting within the range indicated by arrow 8—at which the reaction experienced at its contacts with races 6, 7 is balanced, in the direction of axis 24, by the net force exerted in cylinders 16 and 17. A change in the reactions at the races, and/or a change in the net force exerted from the two cylinders, results both in movement of the ram 15 along axis 24 and rotation about it, until roller 1 reaches a new angular setting at which equilibrium is restored.

Outlet 30 of cylinder 16 leads to a gallery 31 by way of a proportional pressure control valve 32, and outlet 33 of cylinder 17 leads to gallery 31 by way of a similar proportional control valve 34. The valves 32 and 34 are controlled by the electrical output of a micro-processor 35 which responds typically to many inputs, including for instance engine speed, ratio angle, oil temperature etc. but especially to demand by the driver of the vehicle arid which causes the valves 32, 34 to regulate the fluid pressures in cylinders 16, 17 so as to achieve the appropriate ratio setting of roller 1. Fluid passes from gallery 31 both to a lubrication circuit 36, and to a drain 37 by way of a pressure relief valve 38.

According to the invention the common downstream gallery 31 is connected to side 18 of the circuit by a non-return valve 40, and to side 19 by a non-return valve 41. In normal use of the transmission, with ram 15 either stationary or in only slow movement, the use of two moderate sized units as pumps 20, 22 will be sufficient to maintain the two sides 18, 19 and cylinders 16, 17 full of fluid, and to enable valves 32, 34 to work under the control of micro-processor 35 to achieve the desired pressure levels. However if ram 15 moves quickly, due for example to emergency braking of the vehicle and a consequent rise in the reactions between roller I and races 6 and 7, pressure changes follow. Assume that ram 15 moves to the right as shown in FIG. 1, so that the fluid capacity of cylinder 16 rises suddenly. A pressure fall on the left-hand side 18 of the circuit, or in an extreme case cavitation within cylinder 16, is threatened unless the capacity of pump 20 is much greater than normal conditions would require. However, the same sudden movement of ram 15 diminishes the fluid capacity of cylinder 17, and so generates a pressure rise on the right-hand side 19 of the circuit. Fluid is therefore discharged through outlet 33 and valve 34 into gallery 31. Non-return valve 40 is set to open when the pressure in gallery 31 achieves a desired relationship—for instance equality, or excess by a predetermined amount—with the upstream pressure in side 18. This allows fluid from gallery 31 to enter that side and so provides the delivery of pump 20 with the augmentation it requires to meet the abnormal conditions that have occurred. Normal conditions are restored when the said relationship between the pressures in gallery 31 and side 18 ceases, so that non-return valve 40 closes again.

If the sudden movement of ram 15 had been from right to left, valve 40 would of course have remained shut and non-return valve 41 would have opened, allowing fluid from gallery 31 to enter side 19 and augment the delivery of pump 22.

It should be noted that the fluid which passes through valves 40 and 41 in such abnormal condition must come from gallery 31, downstream of the proportional control valves 32 and 34, and not directly from the outlets (30 or 33) of cylinders 16 and 17; any direct connection between those outlets and the non-return valves would simply prevent micro-processor 35 from controlling valves 32 and 34 in normal conditions as well as abnormal.

Typically ram 15 is not the only ram in the system, but is instead the "master" ram to which one or more "slaves" are related. As has already been mentioned, a transmission of the kind shown in specification EP-B-0133330 has six rollers and therefore six rams. FIG. 1 shows a possible arrangement of those six rams, with ram 15 the "master" and rams 45–49 the "slaves". The opposed cylinders of rams 45–49 have inlets 50–54 and 55–59 respectively: inlets 50–54 connect to side 18 of the circuit and inlets 55–59 to side 19. Master ram 15 and slaves 45, 46 form one group controlling the three rollers which transmit traction between one pair of input and output races, and the other three slave rams 47–49 control the three further rollers which transmit traction between the second pair of races. However, because the cylinders of all the slave rams 45–49 49 are in supply-side communication with the corresponding cylinders of the master ram 15, a common pressure exists in them all, and in the event of abnormal conditions the non-return valves 40, 41 open to admit an augmenting flow both to one of the master ram cylinders and to all the corresponding slave cylinders associated with it.

It might in practice be difficult to provide a single non-return valve (40, 41) on each side of the circuit capable of accommodating the sudden and considerable recirculatory flow of fluid that abnormal conditions may require. Greater flows could be made possible, for instance, in various ways. For instance by substituting for the single non-return valve 40 a pair of valves 60, 61 mounted in conduits 62, 63 respectively, as shown in broken lines in FIG. 1. Conduit 62 now connects gallery 31 to the inlets of rams 15, 45 and 46, while conduit 63 provides a separate, second connection between the gallery and rams 47–49. On the other side of the system, valves 64, 65 in conduits 66, 67 would similarly be substituted for the single valve 41. To permit even greater flows, it would of course be possible to connect each individual ram inlet 21, 50–54, 23 and 55–59 to gallery 31 by way of a separate non-return valve, so using twelve such non-return valves in all.

It should be particularly noted that the net flow of fluid through the system to lubrication 36/drain 37 is constant at all times, being equal to the aggregate 2Q of the output of two equal pumps 20, 22 each producing a flow Q. In abnormal conditions, when there is a recirculatory flow of say q from one side of the circuit to the other, the net through flow produced by one side of the circuit will be $Q+q$, and the corresponding quantity on the other side will be $Q-q$, so that the aggregate delivered to lubrication 36 and drain 37 will still be 2Q.

I claim:

1. A hydraulic control system for a continuously-variable-ratio transmission of the toroidal-race rolling-traction type, said hydraulic control system comprising at least a first double-acting ram supporting a first roller, said first double-acting ram having two opposed faces which are exposed, in normal use, to pressurized fluid being supplied via at least one pump and two separate fluid supply lines, each said fluid supply line being pressure-controlled by a separate pressure control valve located downstream of the respective ram face, and the discharge from both of said pressure control valves being combined in a common region, wherein return means are provided for returning pressurized fluid from said common region to a desired one of said fluid supply lines and, when a present difference in fluid pressure between a desired one of said fluid supply lines and said common region occurs, said return means opens and allows pressurized fluid flow from said common region to a desired one of said fluid supply lines.

2. A hydraulic control system according to claim 1, wherein said return means comprises at least one non-return valve for each said fluid supply line, and said at least one non-return valve is set to open at a predetermined pressure level.

3. A hydraulic control system according to claim 1, wherein said return means comprises at least three non-return valves for each said fluid supply line, each said at least three non-return valves are set to open at a predetermined pressure level.

4. A hydraulic control system according to claim 1, wherein at least one further double-acting ram, supporting a further roller, is arranged in parallel with said first double-acting ram such that fluid pressure exerted against the corresponding opposed faces of said parallel double-acting rams are substantially similar at all times.

5. A hydraulic control system according to claim 1, wherein five further double-acting rams, each supporting a further roller, are arranged in parallel with said first double-acting ram such that fluid pressure exerted against the corresponding opposed faces of said parallel double-acting rams are substantially similar at all times.

6. A hydraulic control system according to claim 1, wherein each said fluid supply line has a separate pump and a micro-processor is connected to and controls and pressure control valves.

* * * * *